XR 3,715,733

United Stat

Feiner et al.

[11] 3,715,733

[45] Feb. 6, 1973

[54] ERROR COMPENSATING OPTICAL DETECTOR APPARATUS AND METHOD

[75] Inventors: Alexander Feiner, Rumson, N.J.; Philip A. Harding, Palos Verdes Penisula, Calif.

[73] Assignee: Bell Telephone Laboratories, Incorporated, Murray Hill, Berkeley Heights, N.J.

[22] Filed: Feb. 11, 1972

[21] Appl. No.: 225,515

[52] U.S. Cl.........340/173 LM, 340/173 YC, 350/3.5

[51] Int. Cl.........................G11c 13/04, G11b 27/10

[58] Field of Search...340/178 LM, 174 YC; 350/3.5

[56] References Cited

OTHER PUBLICATIONS

IBM Technical Disclosure Bulletin, Vol. 12, No. 3, Aug. 1969, pp. 416–417.

*Primary Examiner*—James W. Moffiti
*Attorney*—R. J. Guenther et al.

[57] ABSTRACT

An optical memory system comprises a laser light beam that illuminates a hologram, which contains stored bit and position information, in order to produce a position light beam and signal light beams, which are imaged respectively on an array of position detectors and an array of information detectors. Any misregistration of the laser light beam causes the position detectors to generate an error signal which is used to correct the outputs of the information detectors.

19 Claims, 6 Drawing Figures

3715733
OR IN 340/173LM

PATENTED FEB 6 1973

3,715,733

SHEET 3 OF 4

ERROR COMPENSATING OPTICAL DETECTOR APPARATUS AND METHOD

BACKGROUND OF THE INVENTION

This invention relates to error compensating semiconductor optical detector apparatus utilized as part of an optical memory system.

In the publication The Bell System Technical Journal, Volume XLVI, an article, entitled "Design Considerations for a Semipermanent Optical Memory" on page 1267, describes an extremely large capacity optical memory in which laser light is used to retrieve information from an array of holograms. The hologram contains an image matrix array of MXN opaque or transparent spots, which are coincidentally focused upon a detector array containing MXN individual light detectors. One of the essential requirements of this memory is that each of the hologram signal light beams focus on a single light detector. Each of the MXN signal light beams must therefore register on one of the MXN light detectors. Slight errors in registration caused by mispositioning of the laser source or hologram can cause the signal light beams to image in spaces between adjacent detectors, or even worse, the images can fall on adjacent detectors which correspond to different memory address locations.

Among solutions suggested to correct such registration errors is simply to increase the detector size and increase the distance between detectors so that such errors can be tolerated. This technique undesirably increases the detector capacitance, thereby significantly slowing down transient responses. Another solution is to adjust the location of the image by measuring the position error at the detector and to feed back the information to the X–Y deflector in order to adjust mechanically the position of the light source. Still another technique is to measure the positioning error at the detector and mechanically move an imaging mirror for optimum position. These last two techniques appreciably increase access time to a hologram, thereby slowing down the entire speed of the memory.

As is well known, present technology enables the detection of very low intensity light signal beams if they are properly registered on a light detector. It would therefore, be desirable to provide a semiconductor detector array which is able to detect and compensate for registration errors in signal light beams without having to activate any physical movement of apparatus or degrading the response time of the array.

OBJECTS OF THE INVENTION

It is a primary object of this invention to provide compensation for registration errors in received signal light beams without causing any physical movement of the array or light signal light beams and without causing any physical movement of the array or light signal source.

It is another object of this invention to achieve the above-described compensating with substantially no loss in system speed.

It is still a further object of this invention to achieve the above objectives without significantly increasing the amount of silicon area consumed per detector bit.

SUMMARY OF THE INVENTION

These and other objects of the invention are attained in an illustrative embodiment thereof comprising a laser light beam source, a hologram which contains stored signal and position information, an array of interconnected rows and columns of information detectors, an array of position detectors, and a position logic circuit.

When light from the laser light source is illuminated upon the hologram, signal light beams and position light beams are emitted by the hologram and imaged respectively upon an array of information photodetectors and an array of position photodetectors. If the laser light source or the hologram is not correctly positioned, the digital light information emitted will be misregistered on the information detectors. This misregistration causes errors in the output electrical signals of the information detector array, unless compensated for.

The position detectors are coupled to a position logic circuit which creates a registration error signal from the position signal light beam imaged upon the position detectors. The registration error signal corresponds to any registration errors in the signal light beam images incident upon the information photodetectors.

The registration error signal is coupled to row selection logic circuits and column selection logic circuits which cause the position of the electrical output signals of the information detector array to be modified to compensate for any registration errors in the signal light beams emitted by the hologram.

A detailed description of the logic circuitry of the position logic circuit, the row selection logic circuits, the column selection logic circuits, and their respective operations, will be given in the detailed description.

These and other objects, features and embodiments will be better understood from a consideration of the following detailed description taken in conjunction with the accompanying drawing.

DETAILED DESCRIPTION

Figure 1:
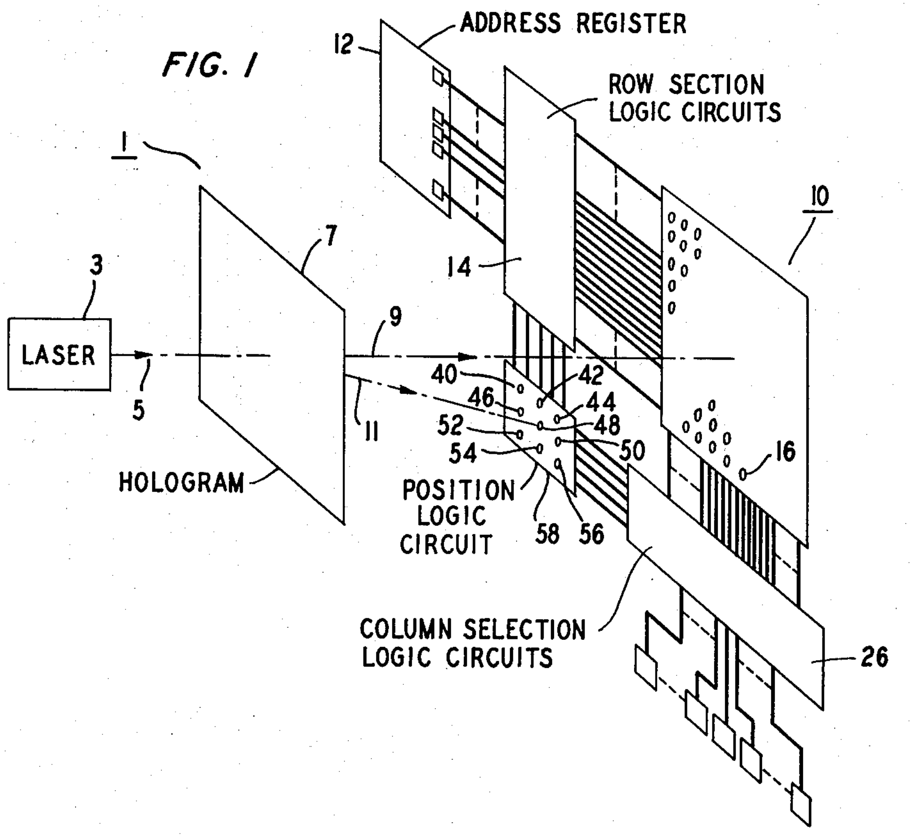
FIG. 1 is a schematic illustration of an optical memory in accordance with one embodiment of the invention.

Referring now to FIG. 1, there is shown schematically in accordance with an illustrative embodiment of the invention an optical memory system 1, comprising a laser light source 3 which emits a light beam 5 that illuminates hologram 7. Hologram 7 contains both signal bit and position bit information, such that when light beam 5 illuminates hologram 7 signal light beams 9 and position light beam 11 are emitted. The relative positions of beams 9 and 11 stay constant independent of the position of the laser 1 or the hologram 7.

As is known, a memory hologram typically contains an image matrix of opaque or transparent spots which correspond to stored bit information. In applicants' invention one of these spots is used to store position information rather than bit information. The spot used to store position information may always be transparent such that when the hologram is illuminated by the laser light source there is always a position signal light beam emitted in addition to the information signal light beams.

Light beams 9 are imaged upon information photodetectors 16 of optical detector apparatus 10. Light beam 11 is imaged upon at least one of the position photodetectors 40, 42, 44, 46, 48, 50, 52, 54, 56 of optical detector apparatus 10. Any registration errors of light beams 9 with respect to the information photodetectors 16 will be identical to registration errors of light beam 11 with respect to the position photodetectors 40–56.

Positioning errors in the laser light source 5 or hologram 7 causes registration errors in the signal light beams 9. Such registration errors of course cause position errors in the electrical output signals from the information detectors 16. The present invention concerns techniques for compensating for, or otherwise correcting, such errors.

The position detectors 40–56 are coupled to a position logic circuit 58, which, as will be explained in detail later, creates a registration error signal from the incidence of the light beam 11 upon photodetectors 40–56. This registration error signal corresponds to the registration of light beams 9 with respect to information detectors 16.

The registration error signal, which is coupled to row selection logic circuits 14, enables the row selection logic circuits 14 to activate the information photodetectors 16 on which the light signal beams 9 are imaged independent of registration errors. Column selection logic circuits 26 combine received electrical signals from the activated information photodetectors 16 with the registration error signal in order to modify the position of the electrical signals to compensate for any registration errors in the signal light beams 9.

If, for example, the laser light source 3 is out of position in the positive vertical direction but is in the proper horizontal position the position light beam 11 is imaged upon position detector 42. The position logic circuit 58 interprets the incidence of the position light beam 11 upon position detector 42 as a registration error in the signal light beams 9 having a positive vertical component. It then creates a registration error signal, the vertical component of which is coupled to the row selection logic circuits 14 and the horizontal component of which is coupled to the column selection logic circuit 26.

The row selection logic circuits 14 are adapted to utilize the vertical component of the registration error signal to activate the information photodetectors 16 which are actually receiving the signal light beams 9. The electrical signals from the activated information photodetectors 16 are coupled to column selection logic circuits 26, which are adapted to combine these electrical signals with the horizontal component of the registration error signal in order to position the electrical signals into the proper horizontal output locations. The detailed operation and logic circuitry of the optical detector apparatus 10, including the position logic circuit 58, the row selection logic circuits 14 and the column selection circuits 26 will be explained and illustrated later.

Figures 2A, 2B:
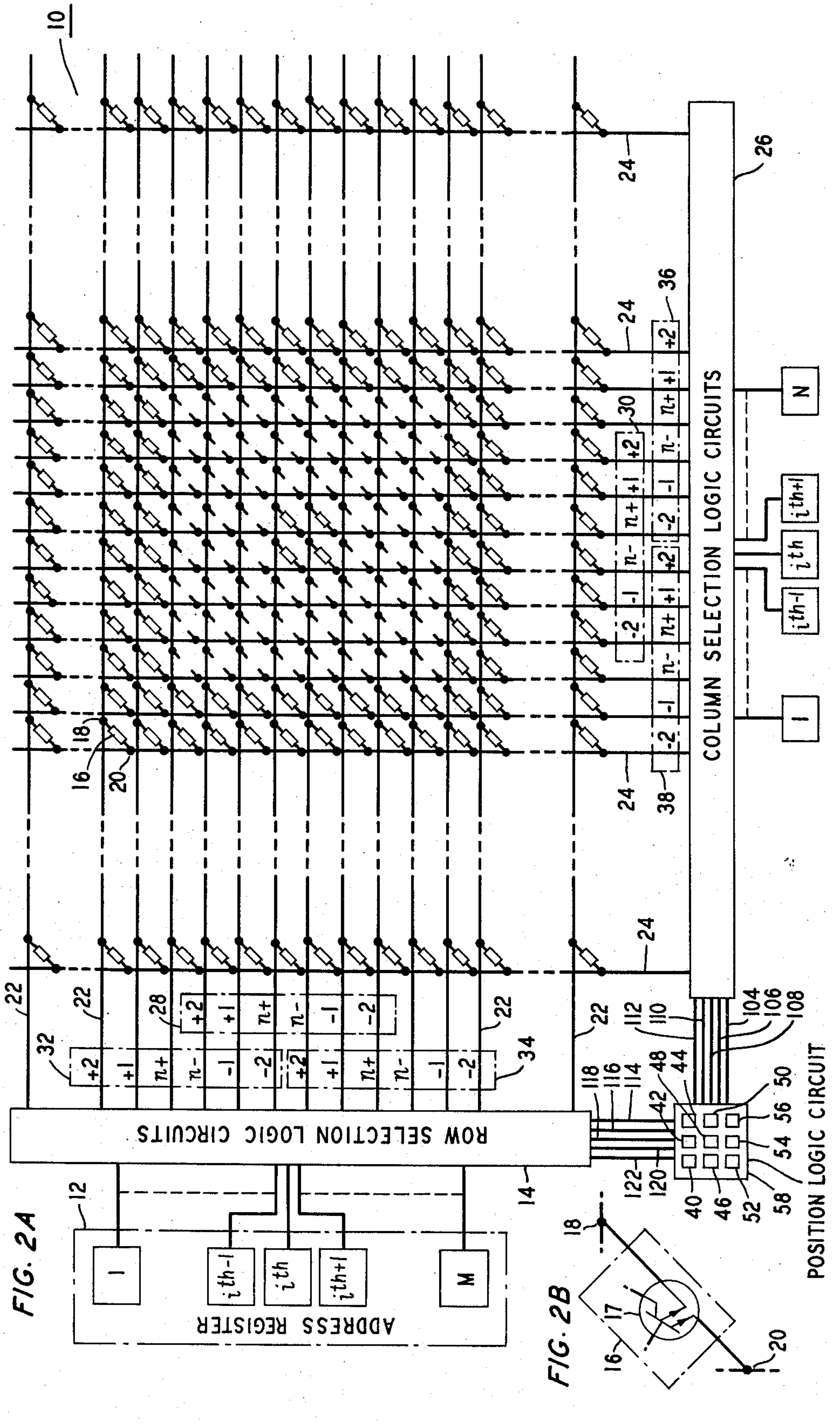
FIG. 2A illustrates the semiconductor memory detector apparatus of FIG. 1 in block diagram form.
FIG. 2B illustrates one embodiment of the information detectors of FIG. 2A.

Referring now to FIG. 2A, there is shown in block diagram form, for illustrative purposes, optical detector apparatus 10. The detector apparatus 10, as illustrated has the capacity of detecting MXN bits from MXN signal light beams. An address register 12 contains M primary word lines, which are coupled to row selection logic circuits 14. Only the $1^{st}$, $i^{th-1}$, $i^{th}$, $i^{th+1}$ and the $M^{th}$ of the M primary word lines are illustrated.

Individual information photodetectors 16, each comprising two terminals, 18 and 20, are arranged in an array of rows and columns. Terminal 18 of each cell is coupled to secondary word lines 22 and terminal 20 is coupled to secondary digit lines 24. Column selection logic circuits 26 are also coupled to the secondary digit lines 24. The output of the column selection logic circuits 26 contains N primary digit lines. Only the $1^{st}$, $i^{th-1}$, $i^{th}$, $i^{th+1}$, and the $N^{th}$ of the N primary digit lines are illustrated.

The detector apparatus 10 is word organized. When a single primary word line, for example, the $i^{th}$ word line, is activated, secondary word lines 22 corresponding to the actual locations of signal light beams of the $1^{st}$ through $N^{th}$ bits of the $i^{th}$ word are activated by the row selection logic circuits 14 independent of which rows the signal light beams would be imaged upon if there were no vertical position errors in the signal light beams. This causes the signal light beams incident on the information photodetectors 16, corresponding to the $i^{th}$ word, to be transferred to the secondary digit lines 24. The electrical signal created on the secondary digit lines 24 is processed through the column selection logic circuits 26 and registered in the proper bit location of the N primary digit lines, independent of which columns the signal light beams would be imaged upon if there were no horizontal position errors in the signal light beams.

Referring now to FIG. 2B, each of the information photodetectors 16 may be a transistor 17, having a photosensitive base and two separate emitters to which terminals 18 and 20 are connected. Signal light beams incident upon the base of the transistors 17 give rise to conduction in transistor 17 through one or the other emitter depending on their relative potentials. If signal light beam is incident upon the base of a selected transistor 17 and the secondary word line 22 coupled to terminal 18 at transistor 17 is held at a relatively high potential with respect to the potential terminal 16, conduction occurs in the transistor 17 through the emitter coupled to the secondary digit line 24.

If there is no signal light beam incident upon the base of the selected transistor 17 then there will be no conduction in the selected transistor 17. The potential of the emitter at transistor 17 coupled to the secondary digit line 24 will be lower than if there had been a signal light beam incident on the base.

A typical prior art detector array having a capacity to detect MXN bits comprises MXN individual detectors. The detector region covered by a single signal light beam is approximately equal to the area of the photosensitive region of just one detector. In this present invention the area covered by the image of a single signal light beam remains the same as that of the prior art, but the photosensitive area of each of the information photodetectors 16 is approximately equal to one-fourth of that of the photosensitive area of prior art photodetectors.

The information photodetectors 16 of applicants' optical detector apparatus 10 are arranged such that the image of a single signal light beam is incident upon a quadrant of four information photodetectors 16 simultaneously. This allows the physical size of the entire array of information photodetectors 16 to be comparable to prior art detectors of identical bit capacity.

In order to accurately detect a single light signal image two adjacent secondary word lines 22 must be activated and the resulting electrical signals on two secondary digit lines 24 must be monitored. There are six secondary word lines 22 enclosed within dashed line rectangle 28. N signal light beams, which contain all the bit information of the $i^{th}$ word, are imaged on the photodetectors 16 coupled to any two adjacent word lines enclosed within dashed line rectangle 28. There are five different possible combinations of two adjacent secondary word lines 22 out of the six enclosed within dashed line rectangle 28. This means that the signal light beams containing bit information of the $i^{th}$ word can be imaged in anyone of five different vertical locations.

When it is desired to detect the N bits of information of the $i^{th}$ word, the $i^{th}$ primary word line is activated by the address register 12. The row selection logic circuits 14 then activate the two secondary word lines 22 enclosed within dashed line rectangle 28, upon which the signal light beams of the $i^{th}$ word are imaged. The registration error signal, which is coupled to the row selection logic circuits 14, supplies registration information necessary to enable the row selection logic circuits 14 to activate the proper secondary word lines 22.

A first possibility is that the light signal beams of the $i^{th}$ word are incident on information detectors 16 which are coupled to the secondary word lines 22, enclosed within the dashed rectangle 28, and labled *n*+ and *n*−. This possibility corresponds to the situation in which there are no vertical position errors in the incident signal light beams of the $i^{th}$ word and they are, therefore, in perfect registration with respect to the $i^{th}$ word information detectors 16.

If the signal light beams corresponding to the $i^{th}$ word are incident on the *n*+ and +1 secondary word lines 22, enclosed within the dashed line rectangle 28, then there is a positive vertical registration error of +1 row of information detectors 16. If the signal light beams are incident on the +1 and +2 secondary word lines 22, enclosed within the dashed rectangle 28, then there is a positive vertical registration error in the signal light beams of +2 rows of information detectors 16. Correspondingly, if the signal light beams are incident upon the information detectors 16 corresponding to the *n*− and −1 secondary word lines, there is a negative vertical registration error of −1 row of information detectors 16. If the $i^{th}$ word bit signal light beams are incident on the −1 and −2 secondary word lines 22, enclosed within the dashed rectangle 28, there is a vertical registration error of −2 rows of information detectors 16.

The horizontal positions of received signal light beams are detected by the column selection logic circuits 26. Dashed line rectangle 30 encloses the six secondary digit lines 24 which correspond to the $i^{th}$ primary digit bit. If signal light beams are incident upon the *n*− and *n*+ secondary digit lines 24, enclosed within dashed rectangle 30, then there is no horizontal position error in the $i^{th}$ bit of any word and, therefore, there is no horizontal registration error. Correspondingly, as is the case in the vertical position, the signal light beams may have position errors which cause registration errors of plus or minus one or two rows of information detectors 16.

There are five possible registration errors in the vertical plane and five in the horizontal plane. This means there is a total of 25 different possible positions for a particular signal light beam. It is to be noted that while any one signal light beam may be incident in any of 25 locations, it is assumed that all received signal light beams have the same position errors and, therefore, that all signal light beams are imaged in the same location within their relative bits.

The secondary word lines 22 enclosed within dashed lines rectangle 32 correspond to the $i^{th-1}$ word; those enclosed within dashed line rectangle 34 correspond to the $i^{th+1}$ word. Secondary digit lines 24 enclosed within dashed rectangle 36 correspond to the $i^{th+1}$ bit and secondary digit lines 24 enclosed within dashed line rectangle 38 correspond to the $i^{th+1}$ bit.

The outputs of optical detectors 40, 42, 44, 46, 48, 50, 52, 54 and 56 are coupled to a position logic circuit 58. The position logic circuit is coupled to the row selection logic circuits 14 by lines 114, 116, 118, 120 and 122. It is coupled to the column selection logic circuits 26 by lines 104, 106, 108, 110 and 112. A light beam containing position information is imaged on the position detectors 40 through 56 concurrently with the imaging of signal light beams upon the information detectors 16. As will be explained later in detail, the position logic circuit 58 creates registration error signals corresponding to registration errors in the incident position signal light beam, which are identical to the registration errors in the signal light beams. The registration error signal is coupled to the row and column selection circuits 14 and 26 where it is utilized to cause the electrical output signals from the information detectors 16 to be registered in the proper output locations of the column selection logic circuits 26.

When the address register 12 activates a particular primary word line, for example, the $i^{th}$ word line, the row selection logic circuits 14 process this information with the registration error signals to activate the proper two adjacent secondary word lines 22, enclosed within the dashed line rectangle 28, on which the signal light beams are actually imaged independent of which rows the signal light beams would be imaged upon if there are no vertical position errors in the signal light beams. The column selection logic circuits 26 process the registration error signals with the information received from the secondary digit lines 24, in order to properly assemble the information from the signal light beams incident upon detectors 16 into the proper N primary digit lines of columns selection logic circuits 26, independent of which columns the signal light beams would be imaged upon if there are no horizontal position errors in the signal light beams. The detailed operation and circuitry of the row selection logic circuits 14 and the column selection logic circuits 26 will be described later.

Figure 3:
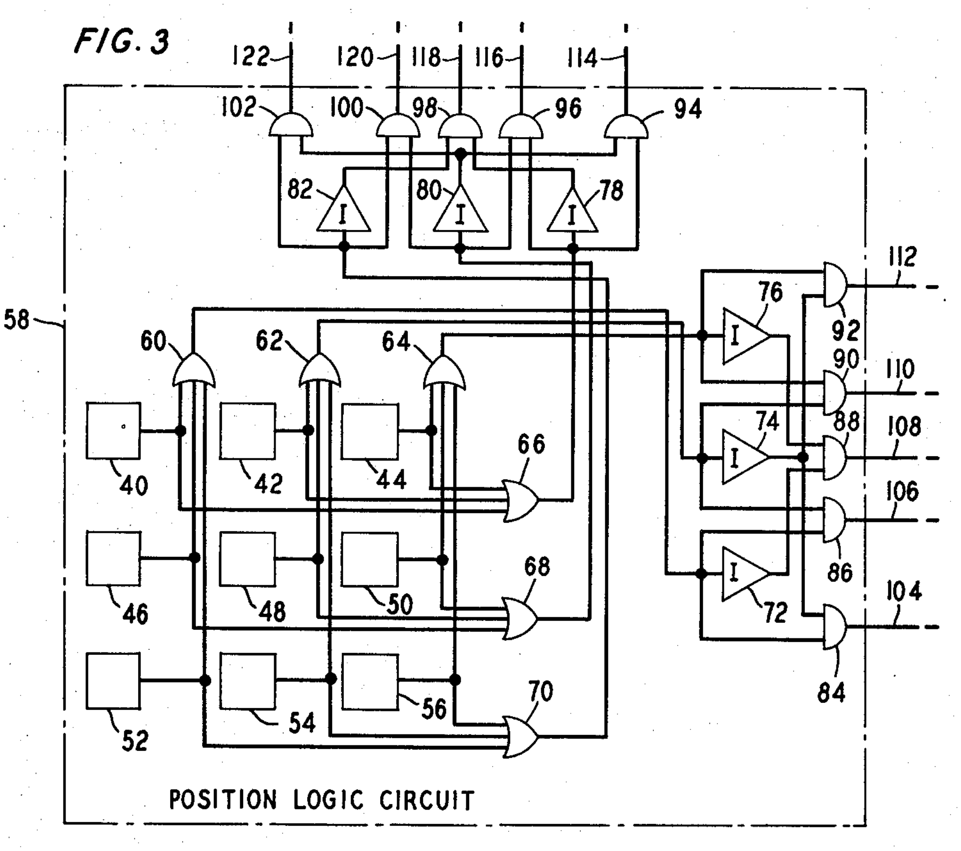
FIG. 3 illustrates one embodiment of one of the block diagrams of FIG. 2A implemented with logic gates.

Now referring to FIG. 3 there is illustrated an embodiment of the position detectors 40 through 56 and position logic circuit 58. The outputs of photodetectors 40, 42, 44, 46, 48, 50, 52, 54 and 56 are coupled to a series of three input OR gates 60, 62, 64, 66, 68 and 70, as illustrated.

The outputs of OR gates 60, 62, 64, 66, 68 and 70 are coupled to inverters 72, 74, 76, 78, 80 and 82, as illustrated. In addition, the outputs of OR gates 60 through 70 are coupled to AND gates 84, 86, 88, 90, 92, 94, 96, 98, 100 and 102, as illustrated.

The outputs of inverters 72 through 82 are coupled to AND gates 84 through 102 as illustrated. The outputs of AND gates 84, 86, 88, 90, 92, 94, 96, 98, 100 and 102 are coupled to output lines 104, 106, 108, 110, 112, 114, 116, 118, 120 and 122, respectively, as illustrated.

A single position signal light beam will be incident on one, two, or four of detectors 40 through 56. As will become clear, independent of whether or not the light position signal beam is incident upon one, two or four of the detectors 40 through 56, only one of the five AND gate outputs coupled to lines 104 through 112 and one of the five AND gates outputs coupled to lines 114 through 122 will be high at a time.

If, for example, it is assumed that there is no error in the position signal light beam, the beam is incident only on detector 48. In this case, the output of the detector 48 will be high and the outputs of detectors 40, 42, 44, 46, 50, 52, 54 and 56 will be low. As can be easily deduced from the logic circuitry of FIG. 3 this will result in a high output on line 108 and a high output on line 118; all other output lines (104, 106, 110, 112, 114, 116, 120 and 122) will be low. Table 1, shown below, illustrates that there are 25 possible combinations of registration error signals available from the 10 output lines 104–122 of the position logic circuit 58 of FIG. 3. An H under a detector means that at least one-quarter of its photosensitive area is being exposed to the position signal light beam. An L under any of these detectors indicates that that detector is receiving substantially no light. The registration error signals from outputs 104 through 112 and 114 through 122 correspond to the position of the signal light beam on the array of position detectors 40 through 56. As is illustrated in FIG. 2A, the output lines 114–122 are coupled to the row selection circuits 14 and the output lines 104–112 are coupled to the column selection circuits 26.

If output line 104 is high there is a horizontal registration error in the signal light beams incident upon information detectors 16 of −2 columns of information detectors 16; if output line 106 is high there is a horizontal registration error of −1 column of information detectors 16; if output line 108 is high the signal light beams contain substantially no horizontal position errors and consequently there is no horizontal registration error; if output line 110 is high there is a horizontal registration error of +1 column of information detectors 16; and if output line 112 is high there is a horizontal registration error of +2 column of information detectors 16.

If output line 114 is high there is a vertical registration error in the signal light beams incident upon information detectors 16 of +2 rows of information detectors 16; if output line 116 is high there is a vertical registration error of +1 row of detectors 16; if output line 118 is high the signal light beams contain substantially no vertical position errors and therefore no vertical registration errors; if output line 120 is high there is a vertical registration error of −1 row of detectors 16; and if output line 122 is high there is a vertical registration error of −2 columns of information detectors 16.

Figure 4:
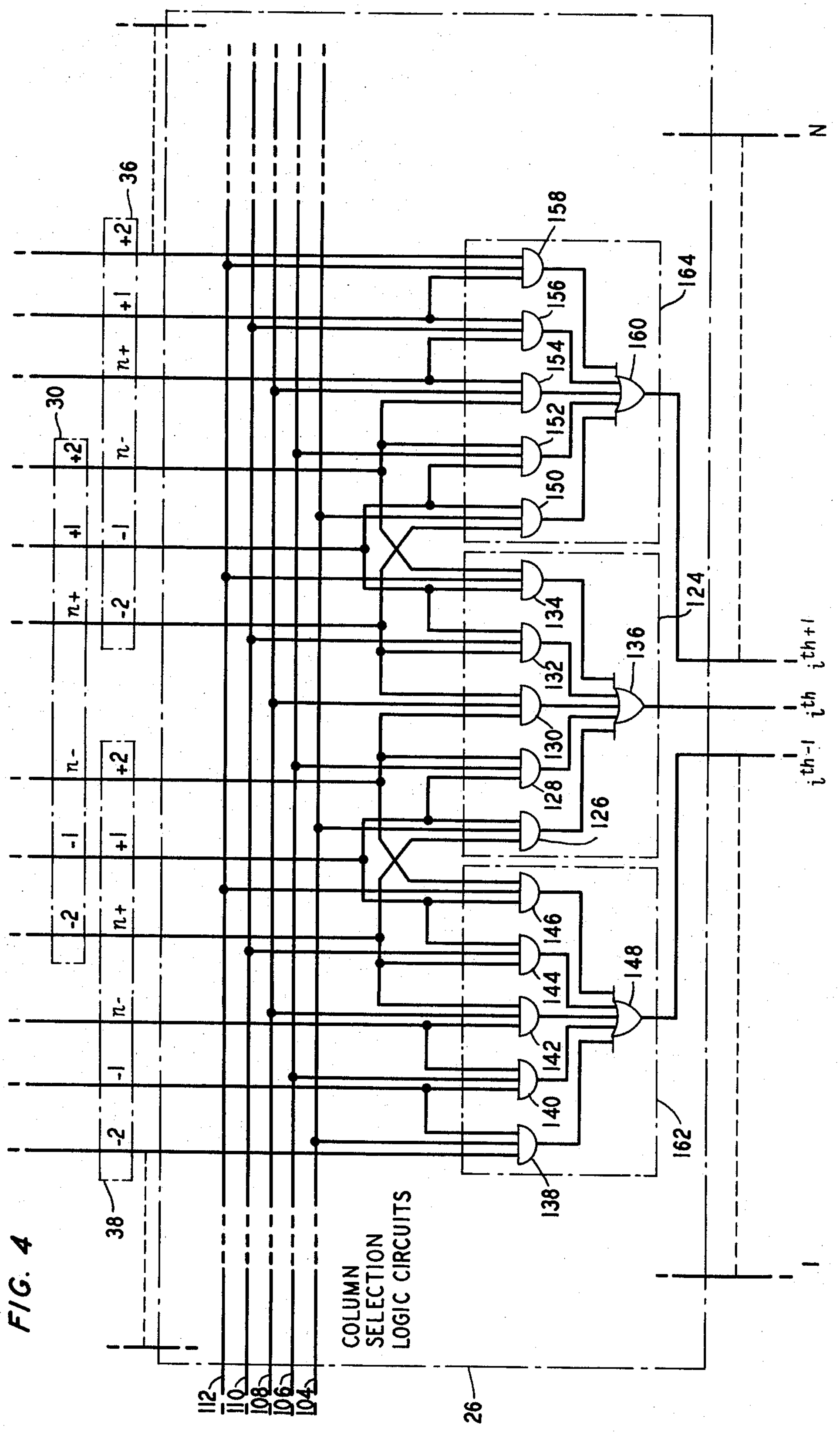
FIG. 4 illustrates one embodiment of another of the block diagrams of FIG. 2A implemented with logic gates.

Referring now to FIG. 4, there is illustrated an embodiment of the column selection logic circuits 26 of FIG. 2A. Only the circuitry needed to detect the $i^{th-1}$, $i^{th}$, the $i^{th+1}$ bits of light signal beams incident on information detectors 16 is illustrated. The logic circuitry, which is enclosed within dashed line rectangle 124, is utilized to correct for horizontal registration errors in the $i^{th}$ bit. It comprises five three-input AND gates 126, 128, 130, 132, 134. The outputs of AND gates 126–134 are coupled to the inputs of a five-input OR

TABLE 1

| | Detectors | | | | | | | | | Output lines: Horizontal registration information | | | | | Output lines: Vertical registration information | | | | |
|---|---|---|---|---|---|---|---|---|---|---|---|---|---|---|---|---|---|---|---|
| | 40 | 42 | 44 | 46 | 48 | 50 | 52 | 54 | 56 | 104 | 106 | 108 | 110 | 112 | 114 | 116 | 118 | 120 | 122 |
| 1 | H | L | L | L | L | L | L | L | L | H | L | L | L | L | H | L | L | L | L |
| 2 | L | H | L | L | L | L | L | L | L | L | L | H | L | L | H | L | L | L | L |
| 3 | L | L | H | L | L | L | L | L | L | L | L | L | L | H | H | L | L | L | L |
| 4 | L | L | L | H | L | L | L | L | L | H | L | L | L | L | L | L | H | L | L |
| 5 | L | L | L | L | H | L | L | L | L | L | L | H | L | L | L | L | H | L | L |
| 6 | L | L | L | L | L | H | L | L | L | L | L | L | L | H | L | L | H | L | L |
| 7 | L | L | L | L | L | L | H | L | L | H | L | L | L | L | L | L | L | L | H |
| 8 | L | L | L | L | L | L | L | H | L | L | L | H | L | L | L | L | L | L | H |
| 9 | L | L | L | L | L | L | L | L | H | L | L | L | L | H | L | L | L | L | H |
| 10 | H | H | L | L | L | L | L | L | L | L | H | L | L | L | H | L | L | L | L |
| 11 | L | H | H | L | L | L | L | L | L | L | L | L | H | L | H | L | L | L | L |
| 12 | L | L | L | H | H | L | L | L | L | L | H | L | L | L | L | L | H | L | L |
| 13 | L | L | L | L | H | H | L | L | L | L | L | L | H | L | L | L | H | L | L |
| 14 | L | L | L | L | L | L | H | H | L | L | H | L | L | L | L | L | L | L | H |
| 15 | L | L | L | L | L | L | L | H | H | L | L | L | H | L | L | L | L | L | H |
| 16 | H | L | L | H | L | L | L | L | L | H | L | L | L | L | L | H | L | L | L |
| 17 | L | L | L | H | L | L | H | L | L | H | L | L | L | L | L | L | L | H | L |
| 18 | L | H | L | L | H | L | L | L | L | L | L | H | L | L | L | H | L | L | L |
| 19 | L | L | L | L | H | L | L | H | L | L | L | H | L | L | L | L | L | H | L |
| 20 | L | L | H | L | L | H | L | L | L | L | L | L | L | H | L | H | L | L | L |
| 21 | L | L | L | L | H | L | L | L | H | L | L | L | L | H | L | L | L | H | L |
| 22 | H | H | L | H | H | L | L | L | L | L | H | L | L | L | L | H | L | L | L |
| 23 | L | H | H | L | H | H | L | L | L | L | L | L | H | L | L | H | L | L | L |
| 24 | L | L | L | H | H | L | H | H | L | L | H | L | L | L | L | L | L | H | L |
| 25 | L | L | L | L | H | H | L | H | H | L | L | L | H | L | L | L | L | H | L |

gate 136. The output of OR gate 136 corresponds to the $i^{th}$ primary digit line on which the $i^{th}$ bit is registered. The secondary digit lines 24 contain within the dashed line rectangle 30, which correspond to the $i^{th}$ bit, are coupled to AND gates 126 through 134; as illustrated. Output lines 104, 106, 108, 110 and 112 from the position logic circuit 58, of FIG. 2, are coupled to the column selection circuits 26, as illustrated.

If it is assumed that there is no horizontal registration error in any of the signal light beams corresponding to the $i^{th}$ bit, then from Table 1 it is easy to see that line 108 is high and lines 104, 106, 110 and 112 are low. If, as assumed, the signal light beams corresponding to the $i^{th}$ bit contain no horizontal position errors they will be incident upon information detectors 16 of the $n+$ and $n-$ secondary digital word lines 24, enclosed within dashed line rectangle 30. If light signal beams are incident upon the information detectors 16 coupled to the n+ and $n-$ secondary digit lines 24, enclosed within dashed line rectangle 30, the $n+$ and $n-$ lines 24 will be at a high potential.

The output of AND gate 130 is high since the three inputs to it, line 118 and the two secondary digit lines 24, n+ and n−, are all high. The output of OR gate 136 is correspondingly high since at least one of its inputs, the one coupled to the output of AND gate 130, is high. A high on the output of AND gate 130 indicates that a light signal beam corresponding to the $i^{th}$ bit of whichever one of the M primary word lines is activated is being received. The activation of the M primary word lines and secondary word lines 22 will be discussed later in detail.

If there is a horizontal registration error of +1 column of detectors 16, the signal light beams corresponding to the $i^{th}$ bit are incident on the information detectors 16 coupled to the $n+$ and +1 secondary digital lines 24, enclosed within the dashed line rectangle 30. As is clear from Table 1, line 110 is high and lines 104, 106, 108 and 112 are low. In addition, the information detectors 16 coupled to the $n+$ and +1 secondary digit lines 24, enclosed within dashed line rectangle 30, cause a high voltage to be placed on these $n+$ and +1 secondary digit lines 24. Since these three lines (110, $n+$, +1), which serve as the inputs to AND gate 132, are all high, the output of AND gate 132 is high. The output of OR gate 136 is high since one of its inputs, the one from AND gate 132 is high. This high on the output of OR gate 136 is indicative of the presence of a signal light beam upon the $i^{th}$ bit of an activated primary word line.

It is to be noted it can be similarly deduced that the incidence of signal light beams upon any 2 adjacent of the six secondary digit lines 24 enclosed within dashed line rectangle 30, will cause the information from the signal light beam to be correctly assembled into the $i^{th}$ primary digit line and therefore to be detected as corresponding to the $i^{th}$ bit.

The logic circuitry for correctly interpreting horizontal registration errors in signal light beams corresponding to the $i^{th-1}$ bit is illustrated within dashed line rectangle 162; the logic circuitry for correcting horizontal registration errors in the $i^{th+1}$ bit is illustrated within dashed line rectangle 164. The circuitry within dashed line rectangles 162 and 164 is essentially identical to that within dashed line rectangle 124. The $i^{th-1}$ circuitry comprises five three-input AND gates 138, 140, 142, 144 and 146 whose outputs are coupled to the inputs of a five-input OR gate 148. The output of OR gate 148 is the $i^{th-1}$ primary digit line which corresponds to the $i^{th-1}$ bit. The logic circuitry of the $i^{th+1}$ bit comprises five three-input AND gates 150, 152, 154, 156 and 158 whose outputs are coupled to a five-input OR gate 160. The output of OR gate 160 is the $i^{th+1}$ primary digit line which corresponds to the $i^{th+1}$ bit. The operation of the circuitry for the $i^{th-1}$ and the $i^{th+1}$ bits is similar to that of the $i^{th}$ bit.

Figure 5:
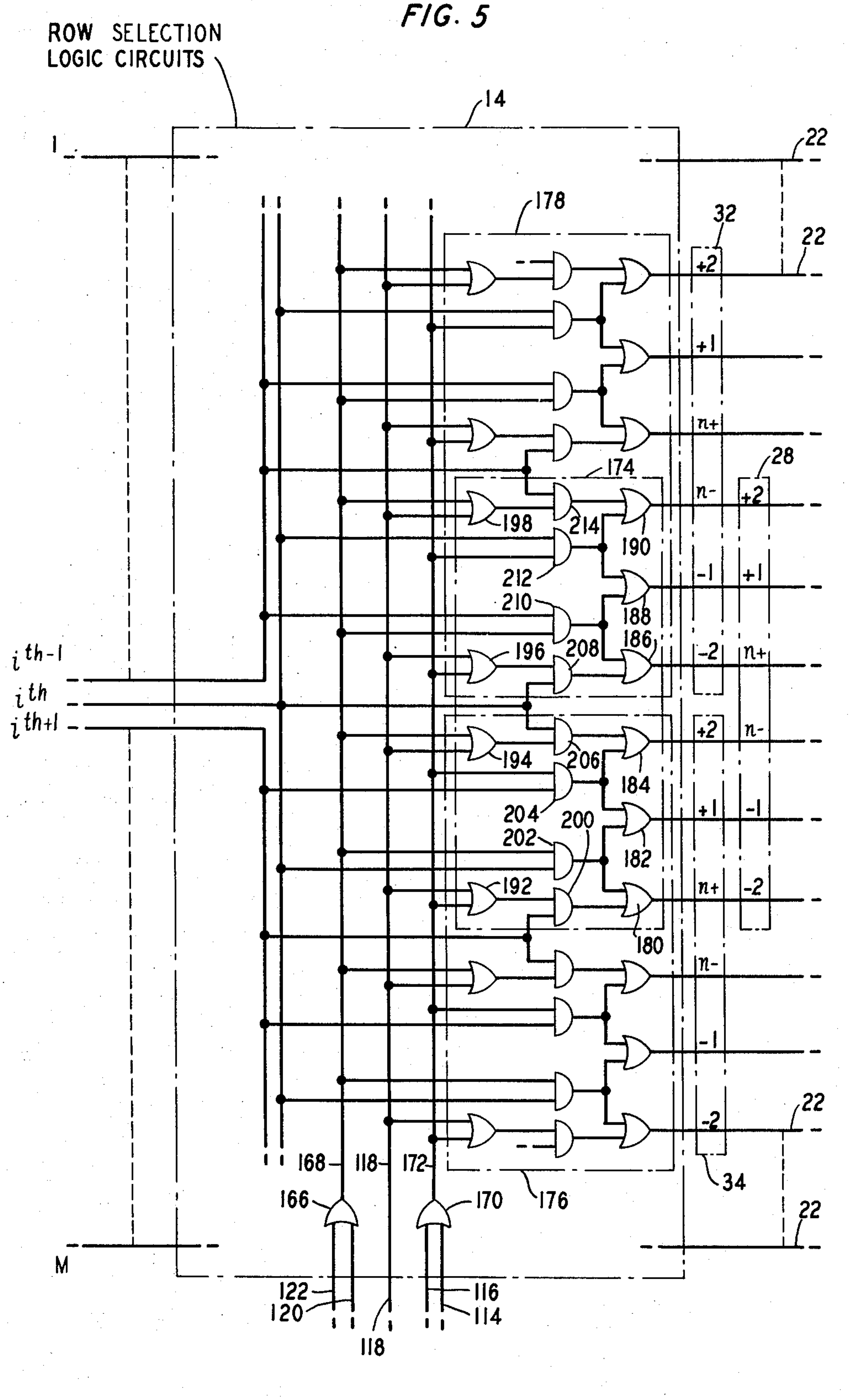
FIG. 5 illustrates one embodiment of still another of the block diagrams of FIG. 2A implemented with logic gates.

Referring now to FIG. 5, there is illustrated a preferred embodiment of the internal structure of the row selection circuits 14 of FIG. 2A. Output lines 120 and 122 serve as inputs to a two-input OR gate 166, the output of which is coupled to line 168. Output lines 114 and 116 serve as the inputs of a two-input OR gate 170, the output of which is coupled to line 172.

For illustrative purposes only the circuitry for activating the secondary word lines 22 corresponding to the $i^{th-1}$, $i^{th}$ and $i^{th+1}$ of the M primary word lines is shown. The logic circuitry enclosed within dashed line rectangle 174 corresponds to the control circuitry utilized to activate any two adjacent secondary word lines 22 that are enclosed within dashed line rectangle 28. The secondary word lines enclosed within dashed line rectangle 28 correspond to the $i^{th}$ word. Correspondingly, the logic circuitry enclosed within dashed line rectangle 176 activates any two adjacent secondary word lines 22 enclosed within dashed line rectangle 34, which correspond to the $i^{th+1}$ word; and the logic circuitry enclosed within dashed line rectangle 178 activates the secondary word lines 22, enclosed within dashed line rectangle 32, which correspond to the $i^{th-1}$ word.

The logic circuitry within dashed line rectangles 174, 176 and 178 is identical. The logic circuits enclosed within dashed line rectangle 174 comprises six 2-input OR gates 180, 182, 184, 186, 188 and 190, the outputs of which are coupled to the six secondary word lines enclosed within dashed rectangle 28, four 2-input OR gates 192, 194, 196 and 198, the inputs of which are coupled to two of the three lines 168, 118 and 172, as illustrated, and eight 2 input AND gates 200, 202, 204, 206, 208, 210, 212 and 214, whose inputs and outputs are connected as illustrated.

If it is first assumed that there are no vertical errors in the signal light beams incident upon information detectors 16 and that the address register activates only the $i^{th}$ primary word line, then, the $n+$ and $n-$ secondary word lines 22, enclosed within dashed line rectangle 28, should be activated in order to detect the incident signal light beams.

If the $i^{th}$ primary word line is high and all other primary word lines are low, then one input each of AND gates 206 and 208 is high. Line 118 is high (see table 1) and therefore the outputs of OR gates 194 and 196 are also high since one of each of the inputs of OR gates 194 and 196 are coupled to line 118, which is high. The outputs of AND gates 206 and 208 are therefore both high since both inputs of both gates are high. The outputs of OR gates 184 and 186 are high since at least one input of each is high. This means that the $n+$ and $n-$ secondary word lines 22 enclosed within dashed line rectangle 28 are high. Therefore, the row selection circuits 14 have correctly activated the proper secondary word lines 22 corresponding to the case in which there is no vertical registration error in the signal light beams incident on detectors 16 of the $i^{th}$ word. As can be easily seen by tracing through the appropriate logic gates the secondary word lines 22 +1, +2, −1 and −2, enclosed within dashed line rectangle 28, are all low. In fact, all secondary word lines 22 except the $n+$ and $n-$ lines enclosed within dashed line rectangle 28 are low.

If it is now assumed that there is a position error in the signal light beam, which corresponds to a positive vertical registration error of +2 rows of information detectors 16, it is necessary to activate the +1 and +2 secondary word lines 22, which are enclosed within dashed line rectangle 28, in order to be able to correctly interpret the incident signal light beams upon information detectors 16 corresponding to the $i^{th}$ word.

From table 1 it is clear that if there is a positive vertical registration error of 2 rows of detectors 16 output line 114 is high and output lines 116, 118, 120 and 122 are low. This means that line 172 is high since the output of OR gate 170 is high and that line 168 is low since the output of OR gate 166 is low. The output of AND gate 212, which serves as an input to OR gates 188 and 190, is high since its inputs are connected to line 172 and the $i^{th}$ primary word line, which are both high. The +1 and +2 secondary word lines 22, enclosed within dashed line rectangles 28, are therefore high because the output of OR gates 188 and 190 are high since at least one input to each OR gate is high.

It is interesting to note that the n+ secondary word line 22 enclosed within dashed line rectangle 28 is also high even though there are no signal light beams incident upon it. There is no adverse effect because of the activation of the n+ secondary word line 22 because there are no signal light beams incident upon the detectors 16 coupled to it, and therefore, no current will flow in corresponding information detectors 16 and no misinformation will be inserted onto the secondary digit lines 24.

If the $n-$ secondary word line 22 enclosed within dashed line rectangle 28 is set high, there will in fact be erroneous information imparted to the secondary digit lines 24 since signal light beams of the $i^{th-1}$ bit are incident on the $n-$ and −1 secondary word lines 22, enclosed within dashed line rectangle 30, which also serve as the +1 and +2 secondary word lines 22 of the $i^{th-1}$ bit. If one traces the appropriate signals through the appropriate logic circuits, it becomes apparent that the $n-$, and −2 secondary word lines 22, enclosed within dashed line rectangle 28, are in fact set low and that therefore there are no erroneous electrical signals sent to the column selection circuits 26 through the secondary digit lines 24.

The reason that not just the +1 and +2 secondary word lines 22 within 28 are set high for a vertical registration of +2 rows of information detectors 16, is that line 172, which is connected to the output of OR gate 170 is high if there is a positive registration error of 1 or 2 rows of information detectors 16. This reduction in the number of error signal lines and the one afforded by the use of OR gate 160 allows for three instead of five input lines to the row selection logic circuits 14. The row selection logic circuits 14 are, therefore, less complex than would be the case if there were five input lines utilized. The activation of a secondary word line 22 in addition to the two needed is known as a "don't care" condition.

It can be easily shown that independent of which of the detectors 16 corresponding to the $i^{th}$ bit is activated that the proper 2 adjacent secondary word lines 22, within dashed line rectangle 28, will be set high and that any other secondary word line 22 which may be also set high will not cause an erroneous electrical signal.

It is to be understood that the embodiment described is merely illustrative of the general principles of the invention. Various modifications are possible consistent with the spirit of the invention. For example, the dual emitter NPN photosensitive transistor may be a dual emitter PNP photosensitive transistor provided the relevant voltages are reversed. In addition, the column selection logic circuits may be simplified if "don't care" conditions are utilized as is illustrated for the row selection logic circuits 14. Still further, the position logic circuits may be simplified if "dont't care" conditions are utilized in both the row and column selection logic circuits. In addition the number of rows and columns of information detectors may be increased so as to expand the error detecting capability of the apparatus.

We claim:

1. An optical memory system comprising:

a light activated memory storage apparatus which contains stored signal and position information;

a light source;

the light source being adapted to image a light beam on the memory apparatus such that signal and position light information is emitted by the memory apparatus;

optical detector apparatus which is adapted to detect signal light information comprising:

an array of information detectors that are adapted to detect signal light information incident thereon;

signal light information emitting from the memory apparatus being imaged on the information detectors;

an array of position detectors that are adapted to detect position light information incident thereon;

position light information emitting from the memory apparatus being imaged on the position detectors;

the position detectors being coupled to a position logic circuit that is adapted to create a registration error signal corresponding to any registration errors in the signal light information incident upon the information detectors from position light information incident upon at least one of the position detectors;

the position circuit being coupled to first circuit means for activating selected information detectors in accordance with the registration error signal; and the position logic circuit being coupled to second circuit means for processing information from the selected information detectors with the information from the registration error signal to correctly assemble the signal light information as if it contained no position errors.

2. The apparatus of claim 1 wherein the light source is a laser and the memory storage apparatus is a hologram.

3. In a method for storing and retrieving information comprising the steps of recording digital information on a hologram; retrieving the stored information by applying a light beam to the hologram, imaging the resulting optical output from the hologram onto a matrix array of information photodetectors that create an output electrical signal indicative of the stored information, the improvement comprising the steps of:

recording position information in the hologram, whereby position light information is emitted from the hologram in response to the reconstructing light beam concurrently with the emission of signal light information; and imaging the position light information onto an array of position photodetectors that are coupled to a position logic circuit, which generates a predetermined signal in response to the position light information images incident upon the position detectors, but, if there is some misregistration in the signal light information images upon the information photodetectors, which generates an error signal indicative of the misregistration; utilizing the error signal to modify the position of the electrical output signal from the information detectors to compensate for misregistration of the light signal information images on the information photodetectors caused by position errors in the light beam source or hologram.

4. Optical detector apparatus for accurately detecting signal light information comprising:

an array of information detectors that are adapted to detect the information from signal light beams incident thereon;

an array of position detectors that are adapted to detect the information from a position light beam incident thereon;

the position detectors being coupled to a position logic circuit that is adapted to create a registration error signal corresponding to any registration errors in the signal light beams incident upon the information detectors, from a position light beam incident upon at least one of the position detectors;

the position circuit being coupled to first circuit means for activating selected information detectors in accordance with the registration error signal; and the position logic circuit being coupled to second circuit means for processing information from the selected information detectors with the information from the registration error signal to correctly assemble the signal light information as if it contained no position errors.

5. The apparatus of claim 4 wherein the size and relative position of the position detectors are such that the position light beam is incident upon one, two, or four position detectors depending on the registration error in the signal light beams incident upon the information detectors.

6. The apparatus of claim 5 wherein the information detector array is arranged in rows and columns of interconnected information detectors.

7. The apparatus of claim 6 wherein the digital information capacity of the detector apparatus is MXN bits and there are 4 (MXN) individual information detectors.

8. The apparatus of claim 7 further comprising:

an address register having M output primary word lines, which are coupled to the first circuit means; and wherein the second circuit means contains N output primary digit lines.

9. The apparatus of claim 8 further comprising:

secondary word lines coupled to the rows of interconnected information detectors and to the first circuit means; and secondary digit lines coupling the columns of interconnected information detectors and to the second circuit means.

10. The apparatus of claim 9 wherein the information detectors are dual emitter junction transistors which have light sensitive base areas.

11. The apparatus of claim 10 wherein the size of the light sensitive base areas and the relative positions of the junction transistors are such that a single light beam is incident upon a quadrant of four information detectors.

12. The apparatus of claim 11 wherein at least two adjacent secondary word lines are activated by the first circuit means to detect a signal light beam.

13. The apparatus of claim 12 wherein there are six adjacent secondary word lines corresponding to each of the M primary word lines.

14. The apparatus of claim 13 wherein signal light information corresponding to a selected primary word line is incident on any two adjacent secondary word lines of the six secondary word lines corresponding to the selected primary word line.

15. The apparatus of claim 14 wherein there are six secondary digit lines corresponding to each of the N output primary digit lines of the second circuit means.

16. The apparatus of claim 15 wherein signal light information corresponding to any bit of a selected primary word line is incident upon any two adjacent secondary digit lines of the six secondary digit lines corresponding to the N output primary digit lines on which the selected bit is registered.

17. The apparatus of claim 16 wherein there are nine position logic detectors which are arranged in a matrix of three rows and three columns.

18. The apparatus of claim 17 wherein the second circuit means comprises five 3-input AND gates and a one 5-input OR gate.

19. The apparatus of claim 18 wherein the first circuit means comprises ten 2-input OR gates and eight 2-input AND gates.

* * * * *